United States Patent
Nuzman et al.

(10) Patent No.: US 8,559,547 B2
(45) Date of Patent: Oct. 15, 2013

(54) CHANNEL ESTIMATION UTILIZING CONTROL SIGNALS TRANSMITTED BY AN ACTIVATING LINE DURING INITIALIZATION

(75) Inventors: Carl J. Nuzman, Union, NJ (US); Adriaan J. de Lind van Wijngaarden, New Providence, NJ (US)

(73) Assignee: Alcatel Lucent, Paris (FR)

( * ) Notice: Subject to any disclaimer, the term of this patent is extended or adjusted under 35 U.S.C. 154(b) by 369 days.

(21) Appl. No.: 12/896,372

(22) Filed: Oct. 1, 2010

(65) Prior Publication Data
US 2012/0082258 A1    Apr. 5, 2012

(51) Int. Cl.
*H04B 15/00*    (2006.01)

(52) U.S. Cl.
USPC ........... 375/285; 370/201; 370/264; 370/537; 455/59

(58) Field of Classification Search
None
See application file for complete search history.

(56) References Cited

U.S. PATENT DOCUMENTS

| | | |
|---|---|---|
| 2006/0029148 A1 | 2/2006 | Tsatsanis |
| 2009/0116582 A1 | 5/2009 | Ashikhmin et al. |
| 2009/0245081 A1 | 10/2009 | Ashikhmin et al. |
| 2010/0177855 A1 | 7/2010 | Ashikhmin et al. |
| 2010/0202554 A1 * | 8/2010 | Kramer et al. ................. 375/285 |

FOREIGN PATENT DOCUMENTS

EP    1936825 A1    6/2008
WO    PCT/US2011/052706    1/2012

OTHER PUBLICATIONS

ITU-T Recommendation G.993.2, "Very High Speed Digital Subscriber Line Transceivers 2," Series G: Transmission Systems and Media, Digital Systems and Networks, Feb. 2006, 252 pages.
U.S. Appl. No. 12/493,328, filed Jun. 29, 2009 and entitled "Crosstalk Estimation and Power Setting Based on Interpolation in a Multi-Channel Communication System."

* cited by examiner

*Primary Examiner* — Adolf Dsouza
(74) *Attorney, Agent, or Firm* — Ryan, Mason & Lewis, LLP (57) ABSTRACT

An access node is configured to control crosstalk between an activating channel associated with a first terminal and active channels associated with respective other terminals. The access node detects a control signal sent by the first terminal over the activating channel in a designated phase of an initialization process of the first terminal, determines an error signal from the detected control signal, correlates the error signal with one or more corresponding signals sent by respective ones of the other terminals over the active channels, estimates crosstalk from the active channels into the activating channel based on the correlation, and configures a vectoring signal processing module to control the estimated crosstalk. The control signal sent by the first terminal comprises a value selected by the first terminal from a set of two or more values and prior to its detection the particular selected value is unknown to the access node.

20 Claims, 3 Drawing Sheets

CHANNEL ESTIMATION UTILIZING CONTROL SIGNALS TRANSMITTED BY AN ACTIVATING LINE DURING INITIALIZATION

FIELD OF THE INVENTION

The present invention relates generally to communication systems, and more particularly to techniques for mitigating, suppressing or otherwise controlling interference between communication channels in such systems.

BACKGROUND OF THE INVENTION

Multi-channel communication systems are often susceptible to interference between the various channels, also referred to as crosstalk or inter-channel crosstalk. For example, digital subscriber line (DSL) broadband access systems typically employ discrete multi-tone (DMT) modulation over twisted-pair copper wires. One of the major impairments in such systems is crosstalk between multiple subscriber lines within the same binder or across binders. Thus, signals transmitted over one subscriber line may be coupled into other subscriber lines, leading to interference that can degrade the throughput performance of the system. More generally, a given "victim" channel may experience crosstalk from multiple "disturber" channels, again leading to undesirable interference.

Different techniques have been developed to mitigate, suppress or otherwise control crosstalk and to maximize effective throughput, reach and line stability. These techniques are gradually evolving from static or dynamic spectrum management techniques to multi-channel signal coordination.

By way of example, certain of the above-noted techniques allow active cancellation of inter-channel crosstalk through the use of a precoder. In DSL systems, the use of a precoder is contemplated to achieve crosstalk cancellation for downstream communications between a central office (CO) or another type of access node (AN) and customer premises equipment (CPE) units or other types of network terminals (NTs). It is also possible to implement crosstalk control for upstream communications from the NTs to the AN, using so-called post-compensation techniques implemented by a postcoder.

One known approach to estimating crosstalk coefficients for downstream or upstream crosstalk cancellation in a DSL system involves transmitting distinct pilot signals over respective subscriber lines between an AN and respective NTs of the system. Error feedback from the NTs based on the transmitted pilot signals is then used to estimate crosstalk. Other known approaches involve perturbation of precoder coefficients and feedback of signal-to-noise ratio (SNR) or other interference information.

Crosstalk estimates are commonly utilized in situations where one or more inactive lines are being activated in a DSL system. The lines that are being activated are referred to as "activating lines" or "joining lines." For example, it may become necessary to activate one or more inactive lines in a synchronization group that already includes multiple active lines, where synchronization in this context refers to alignment in time of the DMT symbols for the different lines. Such activating of an additional line may require that the crosstalk compensation be adjusted accordingly in order to optimize system performance. Exemplary techniques for controlling crosstalk associated with a joining line are disclosed in European Patent Application Publication No. EP 1936825A1, entitled "A Transient Crosstalk Controlling Device," which is incorporated by reference herein. Crosstalk estimates are also used in other situations, e.g., as a means to track changes in crosstalk over time.

A given communication system may incorporate a variety of different types of CPE units that comply with different DSL standards. For example, some of the CPE units may be compliant with a particular vectoring standard, while other "legacy" CPE units do not comply with that particular vectoring standard. In such a communication system, it can be particularly difficult to determine estimates of the crosstalk from active vectoring-compliant lines into an activating legacy line. As a result, the activating legacy line may be unable to achieve full-rate activation, and performance of the system is adversely impacted. This situation arises in many practical communication systems, such as those in which CPE units are gradually being upgraded to support G.vector technology, which was recently standardized in ITU-T Recommendation G.993.5. It is expected that these systems will include a mixture of G.vector compliant and legacy CPE units for a significant period of time, particularly where remote software upgrades of CPE units are not desirable or feasible.

SUMMARY OF THE INVENTION

Illustrative embodiments of the invention provide improved techniques for generating crosstalk estimates in systems which include a combination of vectoring-compliant CPE units and legacy CPE units that are not vectoring-compliant.

In one aspect of the invention, an access node of a communication system is configured to control crosstalk between an activating channel associated with a first network terminal of a communication system and active channels associated with respective other network terminals of the communication system. The access node may comprise, for example, a DSL access multiplexer of a DSL system. In such an embodiment, a given one of the other network terminals is a vectoring-compliant network terminal that may comprise a CPE unit that is substantially compliant with a G.vector vectoring standard, and the first network terminal is a legacy network terminal that may comprise a CPE unit that is not substantially compliant with the G.vector vectoring standard.

The access node detects a control signal sent by the first network terminal over the activating channel in a designated phase of an initialization process of the first network terminal, determines an error signal from the detected control signal, correlates the error signal with one or more corresponding signals sent by respective ones of the other network terminals over the active channels, estimates crosstalk from the active channels into the activating channel based on the correlation, and configures a vectoring signal processing module to control the estimated crosstalk. The control signal sent by the first network terminal comprises a value that is selected by the first network terminal from a set of two or more values and prior to its detection the particular selected value is unknown to the access node.

The quality of the crosstalk estimate may be evaluated, and if the quality of the crosstalk estimate is below a specified quality, the detecting, determining, correlating and estimating operations are repeated for one or more additional iterations until the resulting crosstalk estimate is at or above the specified quality.

The duration of the designated phase of the initialization process may be increased relative to a specified duration of the designated phase, so as to allow sufficient time for performance of at least one iteration of the detecting, determining, correlating and estimating operations.

Advantageously, the illustrative embodiments provide an ability to cancel crosstalk from G.vector lines into legacy lines during initialization of the legacy lines. This can allow full-rate activation to be achieved for legacy CPE units, and avoid utilization of data rate reduction techniques such as upstream power back-off (UPBO) for G.vector compliant CPE units. The data rate that can be achieved by an activating legacy line at the beginning of its active state (e.g., the "showtime" state in VDSL systems) will therefore not be substantially affected by the presence of high-powered G.vector compliant lines. The illustrative embodiments are particularly advantageous in access networks in which CPE units are upgraded gradually as G.vector technology is deployed, such that both G.vector compliant and legacy CPE units are simultaneously present in the same access network, or in which it is otherwise difficult to upgrade or replace certain legacy CPE units.

These and other features and advantages of the present invention will become more apparent from the accompanying drawings and the following detailed description.

DETAILED DESCRIPTION OF THE INVENTION

The present invention will be illustrated herein in conjunction with exemplary communication systems and associated techniques for crosstalk control in such systems. The crosstalk control may be applied substantially continuously, or in conjunction with activating of subscriber lines or other communication channels in such systems, tracking changes in crosstalk over time, or in other line management applications. It should be understood, however, that the invention is not limited to use with the particular types of communication systems and crosstalk control applications disclosed. The invention can be implemented in a wide variety of other communication systems, and in numerous alternative crosstalk control applications. For example, although illustrated in the context of DSL systems based on DMT modulation, the disclosed techniques can be adapted in a straightforward manner to a variety of other types of wired or wireless communication systems, including cellular systems, multiple-input multiple-output (MIMO) systems, Wi-Fi or WiMax systems, etc. The techniques are thus applicable to other types of orthogonal frequency division multiplexing (OFDM) systems outside of the DSL context, as well as to systems utilizing higher order modulation in the time domain.

Figure 1:
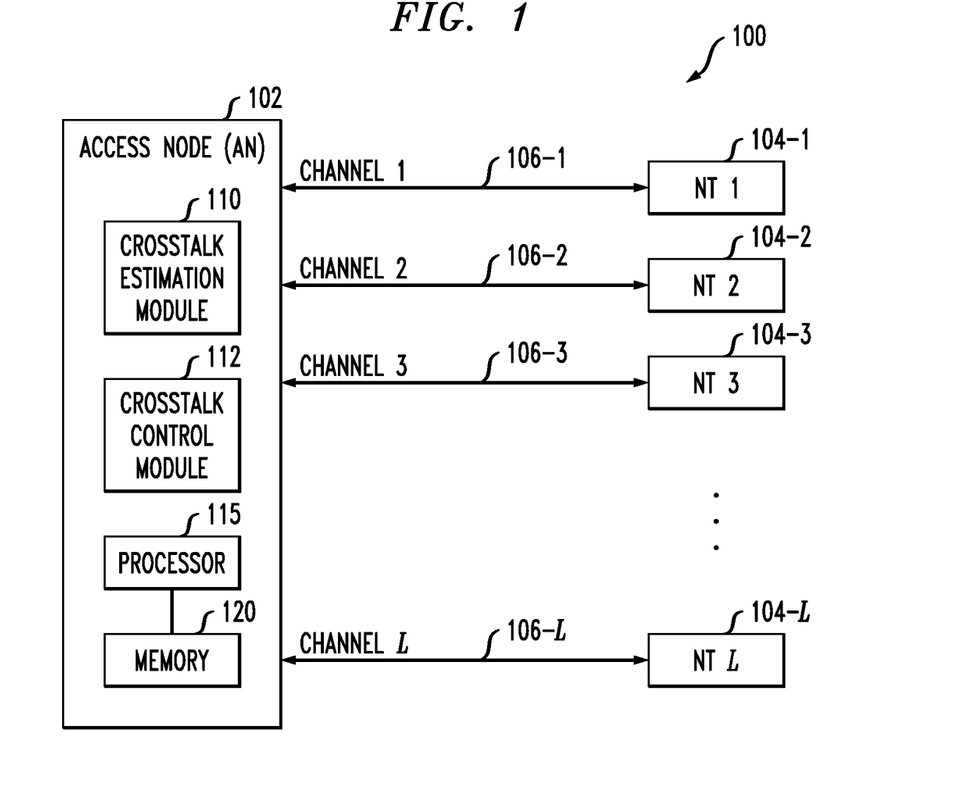
FIG. 1 is a block diagram of a multi-channel communication system in an illustrative embodiment of the invention.

FIG. 1 shows a communication system 100 comprising an access node (AN) 102 and network terminals (NTs) 104. The NTs 104 more particularly comprises L distinct NT elements that are individually denoted NT 1, NT 2, ... NT L, and are further identified by respective reference numerals 104-1, 104-2, ... 104-L as shown. A given NT element may comprise, by way of example, a modem, a computer, or other type of communication device, or combinations of such devices. The access node 102 communicates with these NT elements via respective channels 106-1, 106-2, ... 106-L, also denoted Channel 1, Channel 2, ... Channel L.

As indicated previously herein, in an embodiment in which system 100 is implemented as a DSL system, the AN 102 may comprise, for example, a central office (CO), and the NTs 104 may comprise, for example, respective instances of customer premises equipment (CPE) units. The channels 106 in such a DSL system comprise respective subscriber lines. Each such subscriber line may comprise, for example, a twisted-pair copper wire connection. The lines may be in the same binder or in adjacent binders, such that crosstalk can arise between the lines. Portions of the description below will assume that the system 100 is a DSL system, but it should be understood that this is by way of example only.

In an illustrative DSL embodiment, fewer than all of the L lines 106-1 through 106-L are initially active lines, and at least one of the L lines is a "joining line" that is to be activated and joined to an existing set of active lines. Such a joining line is also referred to herein as an "activating line." A given set of lines may be, for example, a synchronization group, which may also be referred to as a precoding group or a vectored group, or any other combination of active and/or inactive lines.

Communications between the AN 102 and the NTs 104 include both downstream and upstream communications for each of the active lines. The downstream direction refers to the direction from AN to NT, and the upstream direction is the direction from NT to AN. Although not explicitly shown in FIG. 1, it is assumed without limitation that there is associated with each of the subscriber lines of system 100 an AN transmitter and an NT receiver for use in communicating in the downstream direction, and an NT transmitter and an AN receiver for use in communicating in the upstream direction. A given module combining an AN transmitter and an AN receiver, or an NT transmitter and an NT receiver, is generally referred to herein as a transceiver. The corresponding transceiver circuitry can be implemented in the AN and NTs using well-known conventional techniques, and such techniques will not be described in detail herein.

The AN 102 in the present embodiment comprises a crosstalk estimation module 110 coupled to a crosstalk control module 112. The AN utilizes the crosstalk estimation module to obtain crosstalk estimates for respective ones of at least a subset of the lines 106. The crosstalk control module 112 is used to mitigate, suppress or otherwise control crosstalk between at least a subset of the lines 106 based on the crosstalk estimates. For example, the crosstalk control module may be utilized to provide pre-compensation of downstream signals transmitted from the AN to the NT, and additionally or alternatively post-compensation of upstream signals transmitted from the NT to the AN. A more detailed example of a post-compensation technique implemented in an illustrative embodiment of the invention will be described below in conjunction with FIGS. 2 and 3.

The crosstalk estimation module 110 may be configured to generate crosstalk estimates from error samples, SNR values or other types of measurements generated in the AN 102 based on signals received from the NTs 104, or measurements generated in the NTs 104 and fed back to the AN 102 from the NTs 104. It should be noted that the term SNR as used herein is intended to be broadly construed so as to encompass other similar measures, such as signal-to-interference-plus-noise ratios (SINRs).

In other embodiments, crosstalk estimates may be generated outside of the AN 102 and supplied to the AN for further processing. For example, such estimates may be generated in the NTs 104 and returned to the AN for use in precoding, post-compensation, or other crosstalk control applications. The crosstalk estimates may be more generally referred to herein as crosstalk channel coefficients, crosstalk cancellation coefficients, or simply crosstalk coefficients.

The crosstalk estimation module 110 may incorporate interpolation functionality for generating interpolated crosstalk estimates. Examples of interpolation techniques that may be utilized with the present invention are disclosed in U.S. Patent Application Publication No. 2009/0116582, entitled "Interpolation Method and Apparatus for Increasing Efficiency of Crosstalk Estimation," which is commonly assigned herewith and incorporated by reference herein.

The AN 102 may also or alternatively be configured to implement a technique for channel estimation using linear-model interpolation. In implementing such a technique, the AN transmits the pilot signals over respective ones of the lines 106. Corresponding measurements such as error samples or SNR values are fed back from the NTs to the AN and utilized to generate crosstalk estimates in crosstalk estimation module 110. The AN then performs pre-compensation, post-compensation or otherwise controls crosstalk based on the crosstalk estimates. Additional details regarding these and other similar arrangements are described in U.S. patent application Ser. No. 12/493,328, filed Jun. 29, 2009 and entitled "Crosstalk Estimation and Power Setting Based on Interpolation in a Multi-Channel Communication System," which is commonly assigned herewith and incorporated by reference herein.

The crosstalk estimation module 110 may incorporate denoising functionality for generating denoised crosstalk estimates. Examples of crosstalk estimate denoising techniques suitable for use with embodiments of the invention are described in U.S. Patent Application Publication No. 2010/0177855, entitled "Power Control Using Denoised Crosstalk Estimates in a Multi-Channel Communication System," which is commonly assigned herewith and incorporated by reference herein. It is to be appreciated, however, that the present invention does not require the use of any particular denoising techniques. Illustrative embodiments to be described herein may incorporate denoising functionality using frequency filters as part of a channel coefficient estimation process.

The AN 102 further comprises a processor 115 coupled to a memory 120. The memory may be used to store one or more software programs that are executed by the processor to implement the functionality described herein. For example, functionality associated with crosstalk estimation module 110 and crosstalk control module 112 may be implemented at least in part in the form of such software programs. The memory is an example of what is more generally referred to herein as a computer-readable storage medium that stores executable program code. Other examples of computer-readable storage media may include disks or other types of magnetic or optical media.

It is to be appreciated that the AN 102 as shown in FIG. 1 is just one illustration of an "access node" as that term is used herein. Such an access node may comprise, for example, a DSL access multiplexer (DSLAM). However, the term "access node" as used herein is intended to be broadly construed so as to encompass, for example, a particular element within a CO, such as a DSLAM, or the CO itself, as well as other types of access point elements in systems that do not include a CO.

In the illustrative embodiment of FIG. 1 the lines 106 are all associated with the same AN 102. However, in other embodiments, these lines may be distributed across multiple access nodes. Different ones of such multiple access nodes may be from different vendors. For example, it is well known that in conventional systems, several access nodes of distinct vendors can be connected to the same bundle of DSL lines. Under these and other conditions, the various access nodes may have to interact with one another in order to achieve optimal interference cancellation.

Each of the NTs 104 may be configurable into multiple modes of operation responsive to control signals supplied by the AN 102 over control signal paths, as described in U.S. Patent Application Publication No. 2009/0245081, entitled "Fast Seamless Joining of Channels in a Multi-Channel Communication System," which is commonly assigned herewith and incorporated by reference herein. Such modes of operation may include, for example, a joining mode and a tracking mode. However, this type of multiple mode operation is not a requirement of the present invention.

An implementation of the system 100 of FIG. 1 that includes a post-compensator will be described below with reference to FIGS. 2 and 3. Such a post-compensator is used for active crosstalk cancellation for upstream communications from the NTs 104 to the AN 102. However, it should be emphasized that similar techniques can be adapted for use in controlling crosstalk for downstream communications. Furthermore, the techniques disclosed herein are applicable to systems involving symmetric communications in which there is no particular defined downstream or upstream direction.

Figure 2:
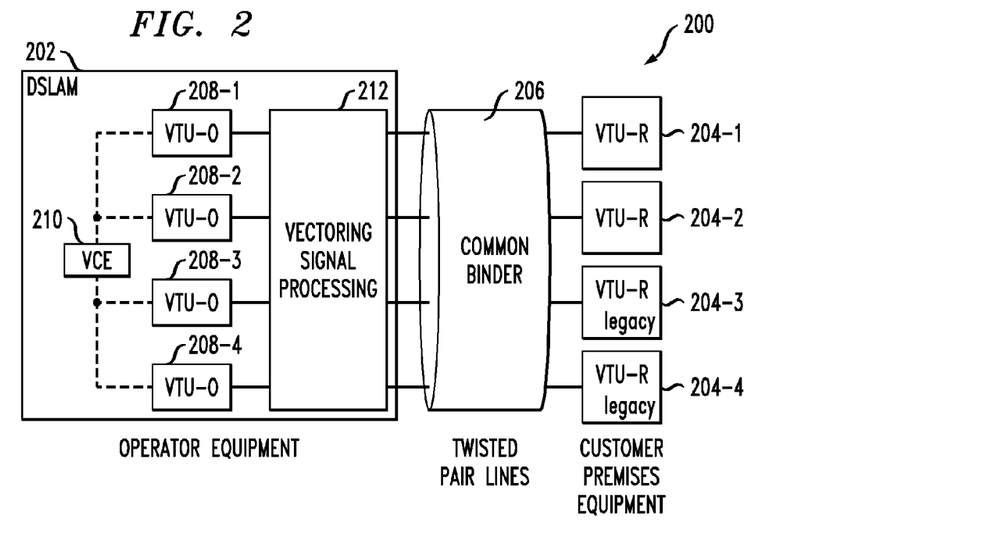
FIG. 2 shows one possible DSL implementation of the FIG. 1 system in an illustrative embodiment.

Referring now to FIG. 2, vectored DSL system 200 represents a possible implementation of the multi-channel communication system 100 previously described. A DSLAM 202 in an operator access node connects to a plurality of CPE units 204 via respective copper twisted pair lines in a binder 206. The CPE units 204 more specifically comprise remote VDSL transceiver units (VTU-Rs) 204-1, 204-2, 204-3 and 204-4. These VTU-Rs communicate with respective operator-side VDSL transceiver units (VTU-Os) 208-1, 208-2, 208-3 and 208-4. The DSLAM 202 further comprises a vector control entity (VCE) 210 and a vectoring signal processing module 212.

In this embodiment, it is assumed without limitation that VTU-Rs 204-1 and 204-2 are compliant with a particular vectoring standard, and more specifically the G.vector standard disclosed in ITU-T Recommendation G.993.5, "Self-FEXT cancellation (vectoring) for use with VDSL2 transceivers," April 2010, which is incorporated by reference herein. Such VTU-Rs are referred to herein as "compliant" VTU-Rs. The other two VTU-Rs 204-3 and 204-4 are examples of what are referred to herein as "legacy" VTU-Rs, and in this embodiment are assumed to be non-compliant with the G.vector standard but compliant with ITU-T Recommendation G.993.2, "Very high speed digital subscriber line transceiver 2 (VDSL2)," February 2006, which is incorporated by reference herein. It is assumed that no changes can be made to the legacy VTU-Rs. It should be noted that use of these particular standards to define compliant and legacy VTU-Rs is by way of illustrative example only, and the techniques of the invention can be adapted in a straightforward manner to other types and arrangements of vectoring-compliant and legacy CPE units.

The vectoring signal processing unit 212 in DSLAM 202 is configured under control of the VCE 210 to implement pre-compensation for signals transmitted in the downstream direction and post-compensation for signals received in the upstream direction. As indicated previously, this requires accurate knowledge of the crosstalk channel coefficients. However, a problem can arise in systems such as system 200 of FIG. 2 that include a mixture of both G.vector compliant and legacy CPE units 204. More specifically, it can be particularly problematic under conventional practice to learn the crosstalk coefficients from the transmitters in the G.vector compliant VTU-Rs 204-1 and 204-2 into the receivers of the VTU-Os 208-3 and 208-4 that are connected to the legacy VTU-Rs 204-3 and 204-4.

Figure 4:
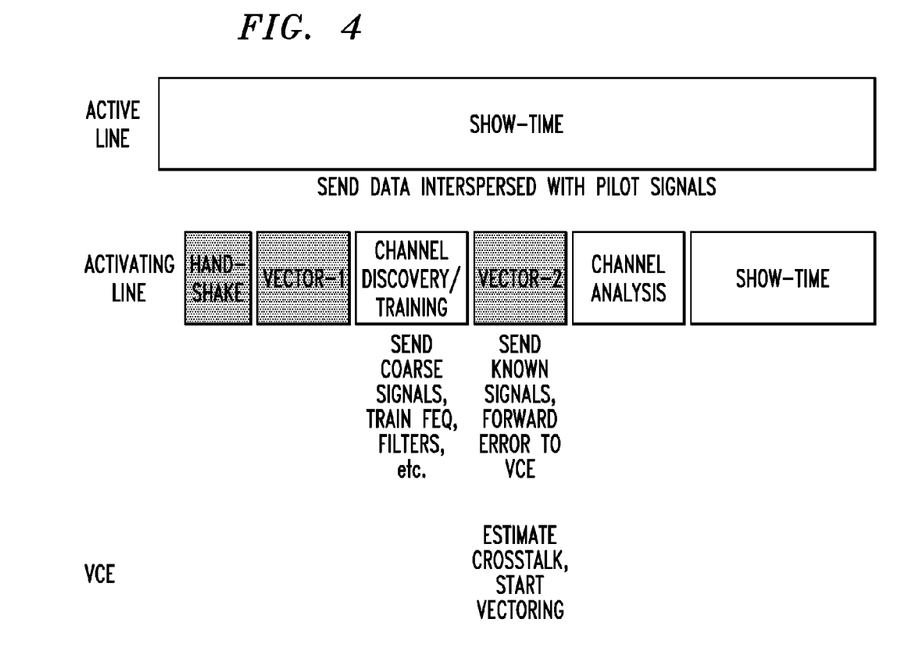
FIGS. 4 and 5 show initialization timelines for respective vectoring-compliant and legacy DSL lines of the FIG. 2 system.
Figure 5:
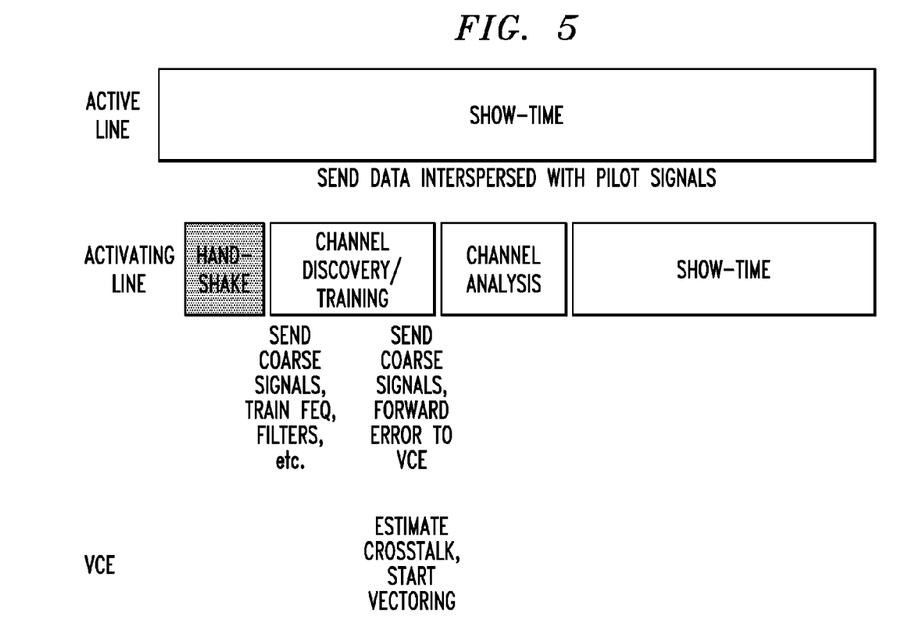

Both G.vector and legacy VTU-Rs are initialized using multiple phases, including a Handshake phase, a Channel Discovery phase, a Training phase, and a Channel Analysis phase, as illustrated in the activating line portions of the initialization timelines of FIGS. 4 and 5. Channel Discovery and Training are considered separate phases but are denoted Channel Discovery/Training in these figures. The Channel Analysis phase is also referred to as the Channel Analysis and Exchange (CAE) phase. The VCE 210 generally needs to learn the crosstalk channel from a set of active VTU-Rs (the "disturbers") to a joining VTU-R that is being activated (the "victim"), before the victim enters the Channel Analysis phase of the initialization. Post-compensation can then be used to enable the joining line to activate at the highest possible data rate, also referred to herein as "full-rate activation." The G.vector ITU G.993.5 Recommendation provides a mechanism for full-rate activation, in both upstream and downstream directions.

For example, in the upstream direction, a G.vector compliant VTU-R such as 204-1 or 204-2 will pause after the Channel Discovery/Training phases and proceed to a new phase denoted O-P-VECTOR-2/R-P-VECTOR-2 (the "Vector-2" phase) before entering the Channel Analysis phase. See the activating line portion of the initialization timeline in FIG. 4. The Vector-2 phase is used to let the activating VTU-R send known pilot sequences upstream. The active disturber lines are also sending pilot sequences periodically during the sync symbols, as indicated in the active line portion of the initialization timeline in FIG. 4. The corresponding upstream VTU-O receiver then measures the error signal, that is, the difference between the expected signal and the received signal. By correlating the error signal with the pilot signals sent by disturbing lines, the crosstalk channel from each disturber can be estimated. This allows the use of post-compensation to achieve full-rate activation for the initializing G.vector compliant VTU-R 204-1 or 204-2.

A legacy VTU-R such as 204-3 or 204-4 in the FIG. 2 embodiment does not have this capability, since the Vector-2 phase is not part of the original VDSL2 initialization procedure. More generally, the initialization procedure for the legacy VTU-Rs does not include any provision to measure the crosstalk from the active VTU-Rs, leading to the problem mentioned previously. Therefore, under conventional practice one generally cannot achieve full-rate activation in the upstream direction when the activating VTU-R is not G.vector compliant. This problem is advantageously solved in the present illustrative embodiment, in the manner described below.

Figure 3:
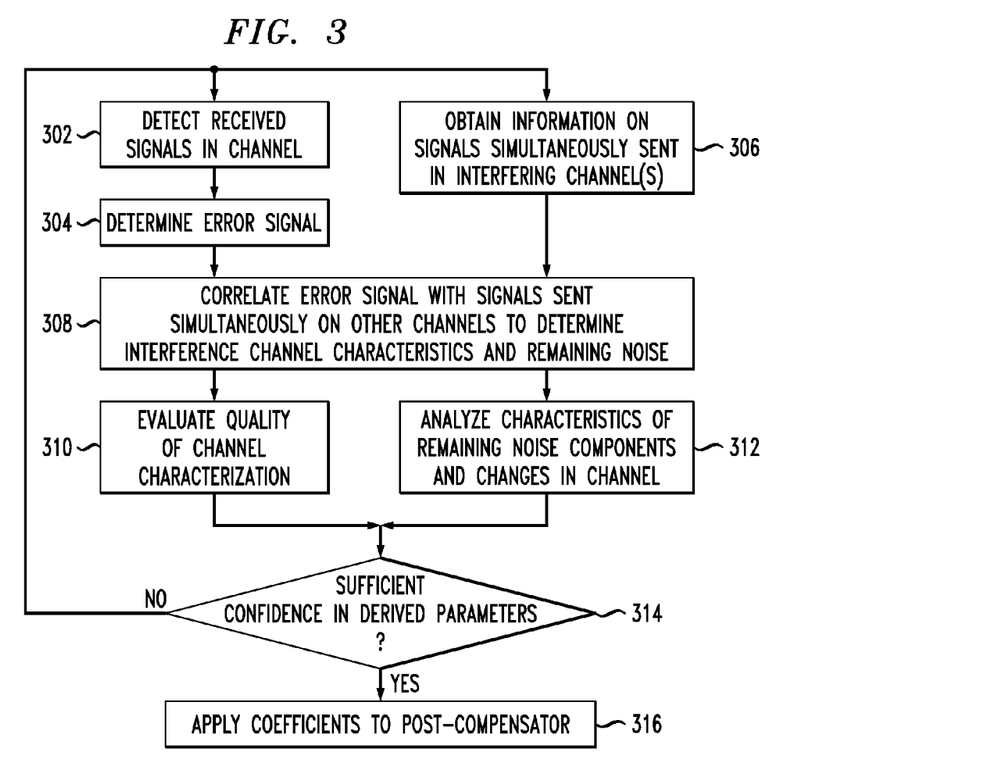
FIG. 3 is a flow diagram illustrating the operation of the vectoring process in the DSL access multiplexer of the FIG. 2 system.

FIG. 3 shows a process implemented in the DSLAM 202 in order to provide full-rate activation for a given one of the legacy VTU-Rs 204-3 or 204-4. It is assumed that at least one of the G.vector compliant VTU-Rs 204-1 or 204-2 is active at the time that the legacy VTU-R begins its initialization. At least one of these G.vector compliant VTU-Rs 204-1 and 204-2 is thus in its active or show-time mode of operation when the legacy VTU-R is initializing, and therefore transmitting data interspersed with pilot signals, as indicated in the active line portions of the initialization timelines of FIGS. 4 and 5. The FIG. 3 process includes steps 302 through 316 as shown, and is implemented using the VCE 210, the vectoring signal processing module 212, and at least a subset of the VTU-Os 208.

In step 302, control signals transmitted upstream in the channel associated with the activating legacy VTU-R in an early portion of the initialization process are detected. These detected control signals are used to determine at least one error signal in step 304. Information on signals simultaneously sent in the interfering channel or channels, associated with the one or more disturber VTU-Rs, is obtained in step 306. The error signal is correlated with the signals sent simultaneously on the interfering channels to determine interference channel characteristics and remaining noise in step 308. The quality of the channel characterization is evaluated in step 310, and the characteristics of remaining noise components and changes in the channel are analyzed in step 312. In step 314, a determination is made as to whether or not there is sufficient confidence in the derived parameters. If not, the process returns to steps 302 and 306 as indicated. If the determination in step 314 is in the affirmative, the resulting crosstalk coefficients are applied to the post-compensator within the vectoring signal processing module 212, as indicated in step 316.

The FIG. 3 process thus estimates the interference from the other active channels in the system 200 by detecting the control signals that are communicated robustly in the early portion of an initialization process of the legacy VTU-R. Error signals are derived, evaluated and correlated with the signals sent on the active lines in order to determine the crosstalk coefficients. The crosstalk estimation process is monitored to determine the quality of the estimation and the possible occurrence of channel variations.

It should be noted that the term "detecting" as used herein is intended to be construed broadly, so as to encompass an arrangement that involves determining which one of several possible control signal values has been sent. For example, in an embodiment in which the DSLAM 202 knows a priori that a particular VTU-R 204 should be sending one of four possible signal values on a given tone, a detector may be configured to determine which of these four possible signal values was actually sent. Such an arrangement is an example of what is more generally referred to herein as a control signal comprising a value that is selected by an activating network terminal from a set of two or more values, where prior to being detected the particular selected value is unknown to the access node.

If the determination in step 314 indicates that more time is needed to complete the estimation process, a number of different techniques may be used to slow down the initialization process, such as delaying acknowledgements, sending negative acknowledgements, or intentionally corrupting some of the control signals beyond recognition to instigate a retransmission.

It is to be appreciated that the particular process steps in the FIG. 3 diagram are presented by way of illustrative example only, and additional or alternative steps can be used in other embodiments.

A more detailed example of certain signal processing operations that may be performed in the flow diagram of FIG. 3 will now be provided, with reference to lines 1, 2 and 3 associated with respective VTU-Rs 204-1, 204-2 and 204-3. In this example, it is assumed that lines 1 and 2 associated with VTU-Rs 204-1 and 204-2 are active vectoring-compliant lines, and line 3 associated with VTU-R 204-3 is an activating legacy line. Line 4 associated with VTU-R 204-4 is neither active nor activating in this example. During symbol period t, the transmitted signals may be represented as:

$x_1[t] = p_1[t/257]$, if $t$ is a multiple of 257

$x_1[t] = d_1[t]$, otherwise $x_2[t]=p_2[t/257]$, if $t$ is a multiple of 257

$x_2[t]=d_2[t]$, otherwise and $x_3[t]=c_3[t]$, where $p_1$ and $p_2$ are pilot sequences, $d_1$ and $d_2$ are data sequences, and $c_3$ is a control signal. The particular control signal is not known a priori by the DSLAM 202, but it is known that in each symbol period it takes one of four complex values:

$v_0=1+j$, $v_1=1-j$, $v_2=-1-j$, and $v_3=1-j$.

After compensation by the frequency domain equalizer (FEQ) and normalization, the signal received by the VTU-O 208-3 of line 3 during the symbol period $t$ is $r[t]=x_3[t]+g_{3,1}x_1[t]+g_{3,2}x_2[t]z_3[t]$ where $g_{3,1}$ and $g_{3,2}$ are normalized crosstalk channel coefficients from line 1 and line 2, respectively, into line 3, and $z_3$ is normalized background noise.

In step 302, the VTU-O 208-3 of line 3 observes $r[t]$ and tries to determine the value of $x_3[t]$. For example, it may estimate the value of $x_3[t]$ as follows:

$$\hat{x}_3[t] = \underset{v \in v_0, v_1, v_2, v_3}{\operatorname{argmin}} |v - r[t]|.$$

In this example, the value sent is determined as the value closest to $r[t]$. This exemplary detector can be made more robust by taking into account that the same value $x_3[t]$ is sent on every tenth tone, modulo a fixed quadrant scrambling rotation pattern. Thus, a detector like the one above can be applied independently on tones 1, 11, 21, 31, ..., and then a final decision can be made by choosing the value detected most frequently on the individual tones, after undoing the effect of the fixed quadrant scrambling rotation pattern. Alternatively, maximum likelihood detection can be used to directly estimate a single value $\hat{x}_3[t]$ from the values $r[t]$ received on tones 1, 11, 21, 31, ..., in a single step.

In step 304, the error signal is determined as:

$e[t]=r[t]-\hat{x}_3[t]$

If the detection is done correctly, then $\hat{x}_3[t]=x_3[t]$, and we have $e[t]=g_{3,1}x_1[t]+g_{3,2}x_2[t]+z_3[t]$.

In step 308, the errors observed at times of the form $t=257k$ are correlated with the pilot sequence sent on line 1, and the result is multiplied by a normalizing factor $C_1$, to get an estimate of the coefficient $g_{3,1}$:

$$\hat{g}_{3,1} = C_1 \sum_{k=0}^{L-1} e[257k]\overline{p_1[k]}$$

$$C_1 = \left(\sum_{k=0}^{L-1} p_1[k]\overline{p_1[k]}\right)^{-1}$$

where $L$ is the period of the pilot sequences $p_1$ and $p_2$. Because these two pilot sequences are mutually orthogonal, we have $$\sum_{k=0}^{L-1} p_2[k]\overline{p_1[k]} = 0.$$

Then it follows that $$\hat{g}_{3,1} = g_{3,1} + C_1 \sum_{k=0}^{L-1} z_3[257k]\overline{p_1[k]}.$$

The sum on the right side of this expression represents corruption of the estimate by background noise. This can be kept small by, for example, making L sufficiently long.

In steps 310 and 312, the evaluation and analysis can be done in a number of different ways. One simple approach would be to obtain a first value of the estimate $\hat{g}_{3,1}$ using L pilot symbols, then obtain a second value of the estimate $\hat{g}_{3,1}$ using a second sequence of L pilot symbols. If the first estimate has the value x, and the second has the value y, the uncertainty can be estimated as:

$$\frac{|x-y|}{|x|+|y|}.$$

In step 314, sufficient confidence on a given tone may be indicated if the uncertainty estimated in steps 310 and 312 is below a designated threshold. Sufficient confidence overall may then be indicated if the per-tone uncertainty is below threshold on a sufficient number of tones. Similarly, in systems in which crosstalk coefficients on adjacent tones are expected to be nearly identical, one can take the value x to be the crosstalk estimate on a given tone, and the value y to be the crosstalk estimate on an adjacent tone. Then the above expression estimates the uncertainty of the crosstalk measurement on the two tones. It should be noted that confidence measures may be determined in many other ways, and interpolation techniques may be used. Also, thresholds can be defined per tone, per group of tones, or in other ways.

The particular signal processing example given above should not be construed as limiting in any way, but is instead intended merely to illustrate one possible set of signal processing operations that may be performed in the FIG. 3 process.

In the present embodiment, the DSLAM 202 is configured to process control signals generated during an early portion of the ordinary VDSL2 initialization process to estimate the crosstalk coefficients. The vectoring signal processing module 212 receives the signals from the legacy VTU-R in the early portion of the initialization process concurrently with the signals from the active VTU-Rs. The corresponding error signals and crosstalk estimates are evaluated to determine whether the initialization of the channel has stabilized and the crosstalk estimates are sufficiently accurate.

As indicated previously, the control signals detected in step 302 of the FIG. 3 process are especially robust signals that can be accurately decoded, enabling the receiver to measure corresponding error signals. Thus the estimation steps of decoding the intended signal, measuring error signals, and correlating error signals with transmissions from the active lines can be performed during the standard VDSL2 initialization process. As indicated previously, the duration of the initialization process, and in particular the Channel Discovery/Training phases, can be extended by delaying acknowledgements, sending negative acknowledgements, or intentionally corrupting signals to force retransmission events.

With reference to the G.vector initialization timeline of FIG. 4, actions taken by the active line, activating line and VCE are shown, in the case of an activating line of a G.vector compliant VTU-R, so as to achieve full-rate activation of the activating line. FIG. 5 shows the corresponding initialization timeline in the case of an activating line of a legacy VTU-R. During the Channel Discovery/Training phase of the initialization process, the legacy VTU-R 204 of the activating line sends unknown, but coarse signals upstream. These are the control signals decoded by the corresponding VTU-O 208 of the activating line, which then measures the difference between the expected and received signals. These error measurements are forwarded to the VCE 210, which estimates crosstalk coefficients, and determines when the vectoring signal processing unit 212 can begin post-compensation using the computed compensation coefficients. Once the post-compensation is working, the activating line moves into the Channel Analysis phase. The coarse signals referred to above generally utilize a low-order signal constellation, such as 4-QAM, where the constellation points are far apart and thus easier to detect in the presence of noise and interference/crosstalk.

Additional details regarding the processing of control signals from the legacy VTU-R in steps 302 and 304 will now be described. The early portion of the VDSL2 initialization process requires the legacy VTU-R to send robust binary signals mapped onto a 4-QAM constellation using pre-defined scrambling. The information is robustly encoded using repetition and is therefore easy to decode, even in the presence of strong interference and excessive noise in the early portion of the initialization process, which includes the Channel Discovery/Training phases. The vectoring signal processing module 212 can immediately decode these signals as they are not encoded over multiple DMT symbols, and then immediately determine the error signals. This is of course also possible at times where the VTU-R does not send any information, i.e., sends an all-zero pattern. The derived error signals are used early in the initialization process to determine the crosstalk, and in particular during the Channel Discovery/Training phases.

Once the control signal has been decoded, it effectively becomes a known signal, and it can be used to determine per-tone error signals in step 304. Prior to decoding, the control signal sent on the activating line is not known at the receiver. The value selected by the VTU-R for this control signal is selected independently from control signals previously exchanged between the VTU-R and the DSLAM. This is in contrast to the process for a G.vector compliant line, where the DSLAM allocates a pilot sequence for the corresponding VTU-R, and this determines the R-P-VECTOR-2 signal in advance.

The error signals can then be correlated against the signals sent on the other lines in step 308. By way of illustrative example, one can correlate the error signals against the pilot signals sent periodically on the disturber lines in order to estimate the crosstalk channel. The particular pilot signals sent over the disturber lines are known in advance to the VCE 210. Therefore, step 306 can be performed by obtaining pilot signal information that is stored in memory 120 and accessible to the VCE 210.

In the early portion of the initialization process, the error signals are used to determine whether the channel is already stable, and whether the FEQ and time domain equalizer (TEQ) have been trained and other parameters, e.g., filter settings, have been set. The VTU-O 208 and VCE 210 can detect changes in the direct channel and translate some of the effects to determine adjusted channel interference parameters. Still, the Channel Discovery/Training phases provide only a limited amount of time in which to estimate the crosstalk and begin to compensate for it. The estimation process is designed such that it provides an indication as to when the channel has stabilized. Part of the interference characteristics may already be determined, but a change in FEQ, TEQ, or other channel-related parameters may require adjustments to be made and some additional measurements to validate the changes, e.g., establish that a parameter caused a phase change and validate the adjusted interference parameters. The channel becomes stable when the FEQ, TEQ, filter settings, and other parameters have been trained.

For the legacy VTU-Rs, it is assumed that the standard initialization process as specified in ITU-T Recommendation G.993.2 is followed. However, as indicated previously, the DSLAM 202 can be configured to monitor the quality of the channel estimation and to extend the Channel Discovery/Training phases as necessary. After completion of the Handshake phase, during which only a few tones are active, the initialization process continues with the Channel Discovery phase, followed by the Training phase and finally the Channel Analysis phase. The last three phases have several sub-phases, and there is a strong interaction between the VTU-O and the VTU-R in this later portion of the initialization process. The time-out for the legacy CPE unit in this embodiment is 10 seconds for each phase. The initialization process is aborted if any of the following events is discovered: time-out of any phase, missing or incomplete task during any phase, violation of the initialization protocol during any phase (including time-out for acknowledging an SOC message), or detection of 250 ms of unscheduled silence.

In delaying the initialization process to allow additional time for estimation of crosstalk channel coefficients, it should be understood that certain phases require a minimum time to complete, and it is generally advantageous to start delaying the operation towards the end of each phase. It is usually desirable to avoid violating the overall 10 second time-out for a particular phase, unless there are significant problems in determining the crosstalk. A restart of the initialization process may not result in a loss of the measurements as the interference channel itself is typically practically constant over significant time intervals. The re-initialization of the symbol synchronization procedure and the adjustment of FEQ and TEQ parameters typically result in phase changes, which, upon measurement of selected tones for the direct channel and interference channel may enable the VCE 210 to use prior measurements to determine the actual channel coefficients.

Once the channel is accurately estimated, the vectored system 200 will be able to suppress the crosstalk interference from the disturbers by post-compensation implemented in the vectoring signal processing module 212. If this post-compensation is active during the Channel Analysis phase, then the activating legacy VTU-R can be configured to achieve the highest possible rate in the active state, which as noted previously herein is also referred to as "show-time."

This ability to achieve full-rate activation for legacy VTU-Rs is particularly beneficial, and an important advantage of the illustrative embodiments. Failure to achieve full-rate activation can lead to certain tones being designated as unusable, thereby limiting the data rate achievable during show-time.

It should also be noted that, under conventional practice, VTU-Rs that are located close to the DSLAM are typically required to utilize upstream power back-off (UPBO) to avoid overwhelming weak signals from more distant VTU-Rs. By providing an ability to cancel crosstalk from G.vector lines into legacy lines during initialization of the legacy lines, the illustrative embodiments can avoid the need to utilize UPBO on the G.vector lines, or can allow UPBO to be used with less conservative settings. The data rate on the activating legacy line at the beginning of show-time will therefore not be substantially affected by the presence of high-powered G.vector compliant lines. These embodiments are particularly advantageous in access networks in which CPE units are upgraded gradually as G.vector technology is deployed, such that both G.vector compliant and legacy CPE units are simultaneously present in the same access network, or in which it is otherwise difficult to upgrade or replace certain legacy CPE units.

Embodiments of the present invention may be implemented at least in part in the form of one or more software programs that are stored in a memory or other processor-readable medium of AN 102 of system 100. Such programs may be retrieved and executed by a processor in the AN. The processor 115 may be viewed as an example of such a processor. Of course, numerous alternative arrangements of hardware, software or firmware in any combination may be utilized in implementing these and other systems elements in accordance with the invention. For example, embodiments of the present invention may be implemented in a DSL chip or other similar integrated circuit device. Thus, elements such as transceivers 208, VCE 210 and vectoring signal processing module 212 may be collectively implemented on a single integrated circuit, or using multiple integrated circuits. As another example, embodiments of the invention may be implemented using multiple line cards of a DSLAM or other access node.

Examples of access nodes having multiple line card arrangements that can be adapted for use in implementing embodiments of the present invention are disclosed in European Patent Application No. 09290482.0, filed Jun. 24, 2009 and entitled "Joint Signal Processing Across a Plurality of Line Termination Cards."

It should again be emphasized that the embodiments described above are presented by way of illustrative example only. Other embodiments may use different communication system configurations, AN and NT configurations, communication channels, crosstalk estimate generation and crosstalk control process steps, depending on the needs of the particular communication application. Alternative embodiments may therefore utilize the techniques described herein in other contexts in which it is desirable to control crosstalk between multiple channels of a communication system.

It should also be understood that the particular assumptions made in the context of describing the illustrative embodiments should not be construed as requirements of the invention. The invention can be implemented in other embodiments in which these particular assumptions do not apply.

These and numerous other alternative embodiments within the scope of the appended claims will be readily apparent to those skilled in the art.

What is claimed is:

1. A method of controlling crosstalk between an activating channel associated with a first network terminal of a communication system and a plurality of active channels associated with respective other network terminals of the communication system, the method being implemented in an access node of the communication system, the method comprising the steps of:
    detecting a control signal sent by the first network terminal over the activating channel in a designated phase of an initialization process of the first network terminal where the control signal sent by the first network terminal comprises a value that is selected by the first network terminal from a set of two or more values and prior to said detecting the particular selected value is unknown to the access node;
    determining an error signal from the detected control signal;
    correlating the error signal with one or more corresponding signals sent by respective ones of the other network terminals over the active channels;
    estimating crosstalk from one or more of the active channels into the activating channel based on the correlation; and
    configuring a vectoring signal processing module of the access node to control the estimated crosstalk.

2. The method of claim 1 wherein the communication system comprises a DSL system and the access node comprises a DSL access multiplexer.

3. The method of claim 2 wherein the other network terminals comprise vectoring-compliant network terminals that are substantially compliant with a specified vectoring standard, and the first network terminal comprises a legacy network terminal that is not substantially compliant with the specified vectoring standard.

4. The method of claim 1 wherein the designated phase of the initialization process comprises at least one of a channel discovery phase and a training phase of the initialization process.

5. The method of claim 1 wherein the designated phase of the initialization process comprises a phase prior to a channel analysis phase of the initialization process.

6. The method of claim 1 wherein configuring a vectoring signal processing module of the access node to control the estimated crosstalk further comprises configuring a post-compensator to provide post-compensation of signals received in the access node from the first network terminal.

7. The method of claim 6 wherein the post-compensation is provided during at least a portion of a channel analysis phase of the initialization process of the activating channel.

8. The method of claim 7 wherein provision of the post-compensation during the channel analysis phase of the initialization process allows the activating channel to subsequently become active at a higher data rate than would otherwise be possible without the post-compensation during the channel analysis phase.

9. The method of claim 1 further comprising the steps of:
    evaluating quality of the crosstalk estimate;
    if the quality of the crosstalk estimate is below a specified quality, repeating the detecting, determining, correlating and estimating steps for one or more additional iterations until the resulting crosstalk estimate is at or above the specified quality.

10. The method of claim 1 further comprising the step of increasing the duration of the designated phase of the initialization process relative to a specified duration of the designated phase so as to allow sufficient time for performance of at least one iteration of the detecting, determining, correlating and estimating steps.

11. The method of claim 1 wherein the duration of the designated phase of the initialization process is increased by delaying transmission of an acknowledgment from the access node to the first network terminal.

12. The method of claim 1 wherein the duration of the designated phase of the initialization process is increased by sending a negative acknowledgment from the access node to the first network terminal.

13. The method of claim 1 wherein the duration of the designated phase of the initialization process is increased by intentionally corrupting a signal sent from the access node to the first network terminal in order to force a retransmission event at the first network terminal.

14. The method of claim 1 wherein the step of detecting the control signal comprises determining which one of the two or more values in the set has been sent by the first network terminal on a particular tone.

15. A non-transitory computer-readable storage medium having embodied therein executable program code that when executed by a processor of the access node of the system causes the access node to perform the steps of the method of claim 1.

16. An apparatus comprising:
an access node configured to control crosstalk between an activating channel associated with a first network terminal of a communication system and a plurality of active channels associated with respective other network terminals of the communication system;
wherein the access node further comprises:
a plurality of transceivers;
a vector control entity; and
a vectoring signal processing module;
wherein a control signal sent by the first network terminal over the activating channel in a designated phase of an initialization process of the first network terminal is detected by one of the transceivers, an error signal is determined from the detected control signal, and the error signal is correlated with one or more corresponding signals sent by respective ones of the other network terminals over the active channels;
where the control signal sent by the first network terminal comprises a value that is selected by the first network terminal from a set of two or more values and prior to said detection the particular selected value is unknown to the access node;
wherein the vector control entity estimates crosstalk from one or more of the active channels into the activating channel based on the correlation; and
wherein the vectoring signal processing module is configured to control the estimated crosstalk.

17. The apparatus of claim 16 wherein the access node comprises a DSL access multiplexer.

18. The apparatus of claim 16 wherein the access node comprises a processor coupled to a memory, wherein at least a subset of the access node operations are implemented under control of said processor.

19. A communication system comprising the access node of claim 16.

20. An apparatus comprising:
at least one integrated circuit for use in an access node of a communication system, said at least one integrated circuit comprising:
a plurality of transceivers;
a vector control entity; and
a vectoring signal processing module;
wherein a control signal sent by a first network terminal over an activating channel in a designated phase of an initialization process of the first network terminal is detected by one of the transceivers, an error signal is determined from the detected control signal, and the error signal is correlated with one or more corresponding signals sent by respective other network terminals over active channels;
where the control signal sent by the first network terminal comprises a value that is selected by the first network terminal from a set of two or more values and prior to said detection the particular selected value is unknown to the access node;
wherein the vector control entity estimates crosstalk from one or more of the active channels into the activating channel based on the correlation; and
wherein the vectoring signal processing module is configured to control the estimated crosstalk.

\* \* \* \* \*